United States Patent [19]

Greenspan

[11] Patent Number: 4,977,001

[45] Date of Patent: * Dec. 11, 1990

[54] PROTECTIVE CLADDING FOR A MOLYBDENUM SUBSTRATE

[75] Inventor: David C. Greenspan, Vienna, Va.

[73] Assignee: Vesuvius Crucible Company, Pittsburgh, Pa.

[*] Notice: The portion of the term of this patent subsequent to Jan. 17, 2006 has been disclaimed.

[21] Appl. No.: 145,947

[22] Filed: Jan. 20, 1988

Related U.S. Application Data

[63] Continuation-in-part of Ser. No. 891,847, Aug. 1, 1986, Pat. No. 4,721,533.

[51] Int. Cl.⁵ .......................... B65D 1/00; B32B 15/04
[52] U.S. Cl. .................................. 428/34.6; 374/208; 428/464; 428/701; 501/68; 501/121
[58] Field of Search ....................... 374/139, 140, 208; 136/234; 428/469, 251, 701, 34.6; 501/68, 121

[56] References Cited

U.S. PATENT DOCUMENTS

| | | | |
|---|---|---|---|
| 3,106,493 | 10/1963 | Japka | 136/234 X |
| 3,250,125 | 10/1966 | Bonn | 374/140 |
| 3,610,045 | 10/1971 | Shearman | 374/139 |
| 4,467,134 | 8/1984 | Pustell | 136/230 |
| 4,662,288 | 5/1987 | Hastings et al. | 428/251 X |
| 4,721,533 | 1/1988 | Phillippi et al. | 136/234 |

Primary Examiner—Thomas J. Herbert
Attorney, Agent, or Firm—Webb, Burden, Ziesenheim & Webb

[57] ABSTRACT

A cladding for a molybdenum body such as a molybdenum tube for protecting the molybdenum from corrosive high temperature environments. The cladding contains oxides of molybdenum, aluminum, silicon and alkali metals in about the following percentages by weight of the total metal content: molybdenum 18–40 percent; aluminum 10–25 percent; silicon 25–50 percent; and, alkali metals 8–12 percent. The cladding may be formed by bringing the molybdenum body into contact in the presence of oxygen, with a refractory containing oxides of aluminum, silicon and alkali metals at a temperature greater than 400° C.

6 Claims, 1 Drawing Sheet

U.S. Patent  Dec. 11, 1990  4,977,001
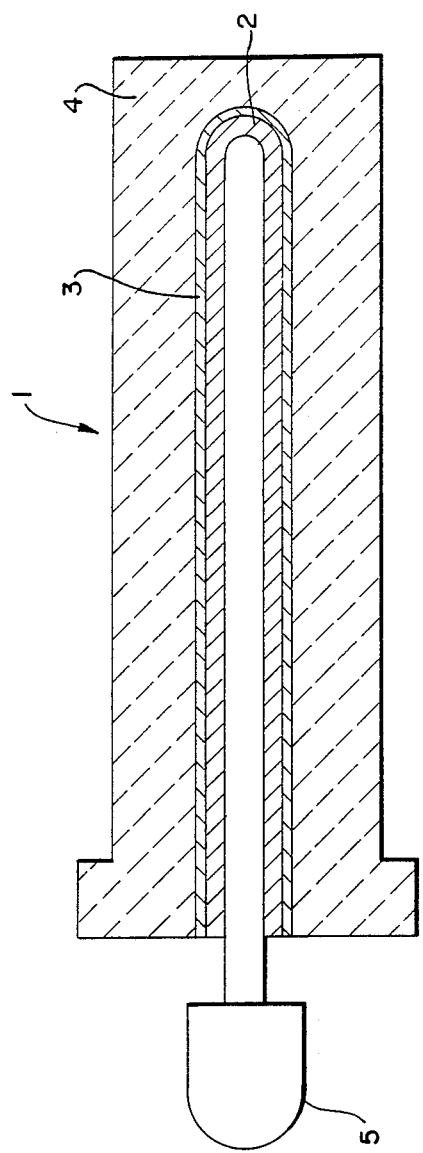
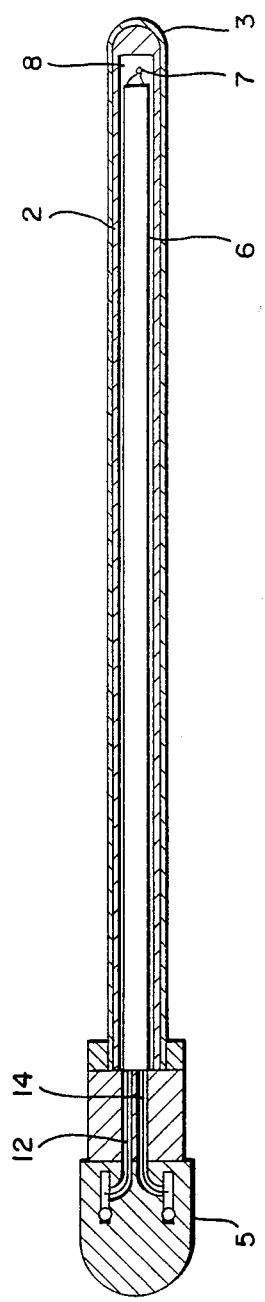

PROTECTIVE CLADDING FOR A MOLYBDENUM SUBSTRATE

This application is a continuation-in-part of application Ser. No. 891,847, filed Aug. 1, 1986, now U.S. Pat. No. 4,721,533 for PROTECTIVE STRUCTURE FOR AN IMMERSION PYROMETER.

This invention relates to materials and methods for protecting structures from high temperature corrosive environments, and more specifically, to a cladding to protect molybdenum structures in high temperature corrosive environments, such as are encountered by pyrometers for measuring the temperature of molten metals.

BACKGROUND OF THE INVENTION

Many industrial and scientific processes require the measurement and control of extremely high temperatures. For example, measurements of the temperatures of molten metals are essential to proper process control in the metal processing industry. Two of the most common instruments used to determine the temperatures of molten metals are the optical pyrometer and the disposable lance thermocouple. However, each of these devices has its disadvantages. The optical pyrometer is not as accurate as is desirable, and can only measure the surface temperature of the molten metal. The disposable lance thermocouple is inaccurate, does not permit continuous measurement of the temperature of the molten metal, and its use involves some safety problems for the person using it.

As a result of the shortcomings of the optical pyrometer and the disposable lance thermocouple, considerable effort has been expended in developing an immersion pyrometer which has a long-term continuous reading capability. In one type of immersion pyrometer, a thermocouple junction is encased in a tube made of a metal with a high melting temperature which is coated with a ceramic, such as $Al_2O_3$ or a mixture of $Al_2O_3$ and $Cr_2O_3$ to protect the metal tube from the molten metal environment. However, in use, the ceramic layer tends to spall and permit molten metal to contact and corrode the metal substrate. The inner metal tube cannot withstand attack by slag and/or the molten metal, and the tube, together with the sensing element enclosed therein, is quickly destroyed. The sensing element, usually a noble metal thermocouple, is expensive and it is desirable to be able to reuse it many times. However, structures which have been designed to protect thermocouples typically make for a slow thermal response, and thus are undesirable for many purposes.

U.S. Pat. No. 4,721,533 describes a temperature sensing system in which a sheath which encloses a temperature-sensing element is protected by a casing which is in contact with high temperature molten media. The casing comprises a combination of refractory metal oxides and graphite, and provides a combination of good heat conductivity, mechanical durability at elevated temperatures, and resistance to corrosion and erosion. The preferred sheath for use with the refractory metal oxide-graphite casing is described in U.S. Pat. No. 4,721,533 as being a cermet-coated closed end molybdenum tube in which the cermet coating comprises a plurality of porous layers of an alumina-chrominia-molybdenum cermet. An uncoated molybdenum tube was also disclosed as being useful as a sheath, although this was not the preferred embodiment. An uncoated molybdenum tube could be used since the outer casing isolates the molybdenum from the corrosive molten metal. The theory set forth in U.S. Pat. No. 4,721,533, was that "the refractory oxide-graphite composition of the outer casing results in a well-controlled carburization of the surface of the molybdenum tube". This appeared to slow the further degradation of the tube, and yielded a "self-healing" surface layer which would permit a long life, as for example, 100 hours.

SUMMARY OF THE INVENTION

It has now been discovered that the surface layer which protects the molybdenum tube is a glassy, amorphous layer which is formed on the molybdenum tube when it is in contact with the ceramic-graphite casing, and in accordance with this discovery, there is provided a new composition of matter and a method of providing a protective cladding on a molybdenum body.

In accordance with this invention, a protective amorphous layer is formed on a molybdenum body by bringing the molybdenum body which is to be clad in contact with a ceramic body containing alumina, silica, and alkali metal components, and heating the resulting mass to a temperature of at least about 400° C. for a period of time long enough to form a glassy, amorphous layer on the molybdenum.

The formation of the amorphous layer in accordance with this invention increases the useful life of a molybdenum tube which is mounted within a ceramic-graphite casing from about 30 hours to well over 250 hours. It is believed that the glassy protective layer, together with the carbon present in the outer ceramic graphite casing at least partially restricts the contact of free oxygen with the molybdenum tube, thereby preventing or at least drastically slowing the destructive oxidation of the molybdenum tube. This invention provides the capability for a reliable, economically feasible temperature measuring device.

The new composition of matter which is provided in accordance with this invention comprises a substantially amorphous composition comprising oxide-containing compounds of molybdenum, aluminum, silicon and at least one alkali metal. The elemental metal constituents comprise the following in percent by weight:

| | |
|---|---|
| molybdenum | 18–40 |
| aluminum | 10–25 |
| silicon | 25–50 |
| alkali metals | 8–12 |

BRIEF DESCRIPTION OF THE DRAWINGS

FIG. 1 is a sectional view of a temperature sensing apparatus including a molybdenum tube mounted within a ceramic-graphite body and having an amorphous layer separating the outer casing from the molybdenum tube.

FIG. 2 is a sectional view showing details of a molybdenum tube and its protective cladding.

DETAILED DESCRIPTION OF THE INVENTION

This invention may be used to provide a protective layer on a molybdenum body having a variety of shapes, and is useful in a variety of circumstances where molybdenum is subjected to high temperature oxidizing environments. The invention will be illustrated in detail by describing the formation of the amorphous layer on a molybdenum tube which is useful as a sheath for a pyrometer. However, the invention is not so restricted and the composition and processes for protecting molybdenum in high temperature oxidizing environments has broad applicability.

FIG. 1 is a sectional view of temperature sensing apparatus 1 having an inner molybdenum tube 2 which contains a temperature sensing element (not shown) centered within an outer ceramic casing 4 with an intermediate amorphous layer 3 which has been formed as a result of the interaction between the ceramic casing 4 and molybdenum tube 2 at an elevated temperature.

As shown in FIG. 2, closed end molybdenum tube 2 defines cavity 8 which contains thermocouple junction 7. Thermocouple wires 12, 14 interconnect terminal head 5 with thermocouple junction 7 and are held in place in molybdenum tube 2 by a double bore insulation 6.

The amorphous layer which is the subject of this invention is formed when a molybdenum body is brought into contact with a ceramic containing $Al_2O_3$, $SiO_2$ and alkali metal components, and the combination is heated to a temperature of at least 400° C. in the presence of sufficient oxygen to form an oxide of molybdenum.

While a temperature as low as about 400° C. is capable of forming a protective cladding, the temperature is preferably at least about 800° C. and most preferably at least about 1000° C. As the temperature increases, so does the mobility and reactivity of the components, such as the oxides of the alkali metals, and a protective amorphous cladding is achieved in a relatively short time. Temperatures greater than about 1700° C. may cause a breakdown of the components in the protective cladding.

The molybdenum may be pure molybdenum or it may be an alloy containing minor amounts of titanium and zirconium such as, for example, 0.4 to 0.8 percent titanium and 0.02 to 0.12 of zirconium. The alloy has the advantages that its use results in a stronger tube than a tube made of pure molybdenum because the added constituents tend to inhibit recrystallization at elevated temperatures.

The ceramic which is in contact with the molybdenum tube must contain $Al_2O_3$ and $SiO_2$ and have associated therewith minor amounts of alkali metal-containing compounds.

The ceramic preferably contains $Al_2O_3$ in a concentration from about 38 to about 52% by weight, $SiO_2$ in a concentration of about 3 to 25% by weight, and at least one alkali metal in a concentration of at least about 2% by weight.

The preferred composition contains graphite in a concentration from about 10% to about 35%. It is believed that the carbon keeps the available free oxygen to a minimum.

Refractories which have compositions as set forth above are available commercially and Table I below sets forth the composition of some of these refractories:

TABLE I

| Component | I | II | III | IV | V |
|---|---|---|---|---|---|
| $Al_2O_3$ | 42–46 | 43–47 | 38–42 | 49–53 | 52 |
| $ZrO_2$ | — | 3–5 | 6–8 | 4–6 | — |
| Free Carbon | 27–29 | 28–30 | 24–26 | 28–29 | 31 |
| $SiO_2$ | 19–23 | 13–17 | 17–19 | 3–5 | 13 |

TABLE I-continued

| Component | I | II | III | IV | V |
|---|---|---|---|---|---|
| SiC | 4–6 | 4–6 | 8–10 | 8–10 | — |
| Alkali Metal | 0.5–5 | 0.5–5 | 0.5–5 | 0.5–5 | 5 |

When the molybdenum body is placed in contact with the ceramic body as above described, and the temperature is increased to at least about 400° C., a reaction begins wherein an amorphous layer is formed which consists essentially of oxygen containing compounds of molybdenum, aluminum, silicon and alkali metals. In the following description of the composition of the amorphous layer, the concentration of each metal is given as a percent of the total metal concentration and for this purpose, silicon is treated as a metal. The concentration of molybdenum may range from abut 18 to about 40% by weight, and is preferably about 35–40% by weight, and most preferably about 39–40% by weight. The concentration of aluminum may range from about 10 to about 25% by weight, is preferably about 10–15% by weight, and most preferably is from about 10 to about 12% by weight. The concentration of silicon may range from 25 to about 50% by weight, and is preferably from about 25 to about 30% by weight. The alkali metals may be present in a concentration of from about 8 to about 12% by weight, and the concentration is preferably about 8 to about 10% by weight. Typically, the alkali metals will consist of sodium in a concentration from about 3 to about 5% by weight, and potassium in a concentration from about 5 to about 7% by weight.

The composition may also contain other glass-forming components such as, for example, iron, calcium, magnesium, and zirconium which may be present in a concentration no more than about 20% and preferably in a concentration of about 3–4%. These components may be present as a result of impurities or the presence of other metals in the structure.

While the inventor does not wish to be bound by any theory as to the exact mechanism by which the protective amorphous layer is formed, the following description is offered to help in understanding the invention.

The initial step in the formation of the amorphous layer requires that free oxygen, such as from ambient atmosphere, contact the molybdenum surface at temperatures at least about 400° C. The $Mo_xO_y$ oxide which begins to form (usually x≈1 y=3) within 10 to 15 minutes at a temperature of about 400° C., becomes stable very rapidly. When the refractory casing is in contact with molten steel, the ambient temperature rapidly (within about 10 minutes) reaches 1550° C. at which temperature alkali present in the alumina graphite casing as $R_2O$ (R=Na, Li, K) becomes mobile, dissociates as $R^+$ and combines with $Mo_xO_y$ to form a glassy substance. This reaction occurs within the first hour or so of use at operating temperatures of about 1550° C.

As the molybdenum tube also physically contacts the aluminagraphite material, silica (as $SiO_2$) and free silicon ions ($Si^{+4}$), as well as carbon, will also become incorporated into the freshly oxidized surface of the molybdenum tube. Evidence of silica and carbon on the molybdenum surface as early as one hour at a temperature of about 1550° C. has been demonstrated.

The complex oxide/carbide grows in thickness as the temperature is maintained at 1550° C., and it becomes a stable entity which completely covers the surface of the molybdenum. Thermodynamically, $MoSi_2$, $MoO_3$, SiO$_2$, Na$_2$O-SiO$_2$ and combinations of these oxides are reasonably stable over long periods of time at these operating temperatures.

As the ambient environment around the molybdenum tube has a high concentration of carbon and a somewhat restricted amount of oxygen, any free oxygen is taken up in the amorphous layer and used to create additional glassy material. This process appears to reach a steady state at about 20 hours of operation. This pickup of available free oxygen is the means by which further oxidation of the molybdenum tube is prevented.

Having thus described the invention, the following example is offered to illustrate it in more detail:

EXAMPLE

A molybdenum tube 0.120 inch in wall thickness, 0.50 inch in diameter, and 24 inches long was placed in an outer casing which was formed from a powder mixture consisting of 51% alumina, 30% graphite and 17% silica. The mixture also contained about 2% of the alkali metals sodium and potassium. The resulting structure in the presence of free oxygen from an ambient atmosphere was heated to a temperature above 400° C. At about 400° C. an amorphous layer was formed consisting of oxygen-containing compounds of silicon, molybdenum and aluminum with minor amounts of alkali metals present. The initial amorphous layer did not form continuously about the refractory metal tube, but rather comprised discrete areas of amorphous material. After about 10 to 20 hours at a temperature of about 1550° C., the surface of the refractory metal tube was completely covered with the protective amorphous layer. The composition of the amorphous layer varied with the time for heat treatment and the following table gives compositional analyses for the metallic components formed on one tube after 24 hours of heat treatment at about 1550° C. and on another tube after about 50 hours of heat treatment at about 1550° C. After about 50 hours the amorphous layer reaches what appears to be a maximum thickness which may vary from about 1/100th of an inch to about ⅛th of an inch, and which depends on the precise operating conditions.

TABLE II

| Element | Weight Percent 24 Hours Heat Treatment | Weight Percent 50 Hours Heat Treatment |
| --- | --- | --- |
| Na | 5.09 | 3.87 |
| Al | 21.23 | 11.42 |
| Si | 48.39 | 27.74 |
| K | 6.70 | 5.90 |
| Mo | 18.60 | 39.86 |
| Fe | — | 11.21 |

As can be seen from Table II, the concentration of molybdenum in the amorphous layer increases with an increase in the time of heat treatment, with a concommittant decrease in the concentration of the other metals, especially the predominant metals which are in the outer casing, i.e., aluminum and silicon. The Fe present as shown in Table II arises from materials of construction used in the article of manufacture itself, i.e., the thermocouple assembly.

The useful in-service life of the molybdenum tube having the protective amorphous layer is well over 250 hours as compared with the useful in service life of an unprotected molybdenum tube of about 30 hours.

The foregoing description and example are intended to illustrate and describe the invention but not to limit it, and the invention should only be restricted in accordance with the following claims.

What is claimed is:

1. A corrosion-resistant article comprising a molybdenum substrate having a reaction formed clad layer of a substantially amorphous composition comprising oxide-containing compounds of the elements molybdenum, aluminum, silicon and at least one alkali metal, said composition comprising said elements in about the following percentages by weight of the total metal content:

| | |
| --- | --- |
| molybdenum | 18–40 |
| aluminum | 10–25 |
| silicon | 25–50 |
| alkali metal(s) | 8–12. |

2. A corrosion-resistant article in accordance with claim 1 wherein said molybdenum substrate is an elongated, closed end tube.

3. A corrosion-resistant article in accordance with claim 1 wherein said amorphous composition comprises about 35–40 weight percent molybdenum, about 10–15 weight percent aluminum, and about 25–30 weight percent silicon.

4. A corrosion-resistant article in accordance with claim 1 wherein said amorphous composition contains other metals in a concentration of about 10–12 percent by weight of the total metal content.

5. A corrosion-resistant article in accordance with claim 1 wherein said alkali metals comprise about 3–5 percent by weight sodium and about 5–7 percent by weight potassium.

6. A corrosion-resistant article in accordance with claim 1 wherein said amorphous composition comprises:

| Element | Percent by Weight |
| --- | --- |
| molybdenum | 39–40 |
| aluminum | 10–12 |
| silicon | 25–30 |
| sodium | 3–4 |
| potassium | 5–6. |

* * * * *

UNITED STATES PATENT AND TRADEMARK OFFICE
CERTIFICATE OF CORRECTION

PATENT NO. : 4,977,001

DATED : December 11, 1990

INVENTOR(S) : David C. Greenspan

It is certified that error appears in the above-identified patent and that said Letters Patent is hereby corrected as shown below:

Column 4 Line 17 "abut" should read --about--.

Column 4 Line 59 "aluminagraphite" should read --alumina-graphite--.

Column 6 Line 7 "in service" should read --in-service--.

Signed and Sealed this

Nineteenth Day of May, 1992

Attest:

DOUGLAS B. COMER

Attesting Officer

Acting Commissioner of Patents and Trademarks